C. G. EIDSON, T. DAVIS & D. E. CROUSE.

PNEUMATIC STARTING DEVICE FOR INTERNAL COMBUSTION ENGINES.

APPLICATION FILED JAN. 21, 1918.

Reissued May 7, 1918.

14,466.

3 SHEETS—SHEET 1.

*Inventors:*
*Charles G. Eidson,*
*Thomas Davis,*
*David E. Crouse,*
*by Spear, Middleton, Donaldson & Spear*
*Atty's.*

C. G. EIDSON, T. DAVIS & D. E. CROUSE.

PNEUMATIC STARTING DEVICE FOR INTERNAL COMBUSTION ENGINES.

APPLICATION FILED JAN. 21, 1918.

Reissued May 7, 1918.

14,466.

3 SHEETS—SHEET 2.

*Inventors:*
*Charles G. Eidson,*
*Thomas Davis,*
*David E. Crouse,*
*by Spear, Middleton, Donaldson & Spear*
*Atty's.*

C. G. EIDSON, T. DAVIS & D. E. CROUSE.
PNEUMATIC STARTING DEVICE FOR INTERNAL COMBUSTION ENGINES.
APPLICATION FILED JAN. 21, 1918.
Reissued May 7, 1918. 14,466.
3 SHEETS—SHEET 3.
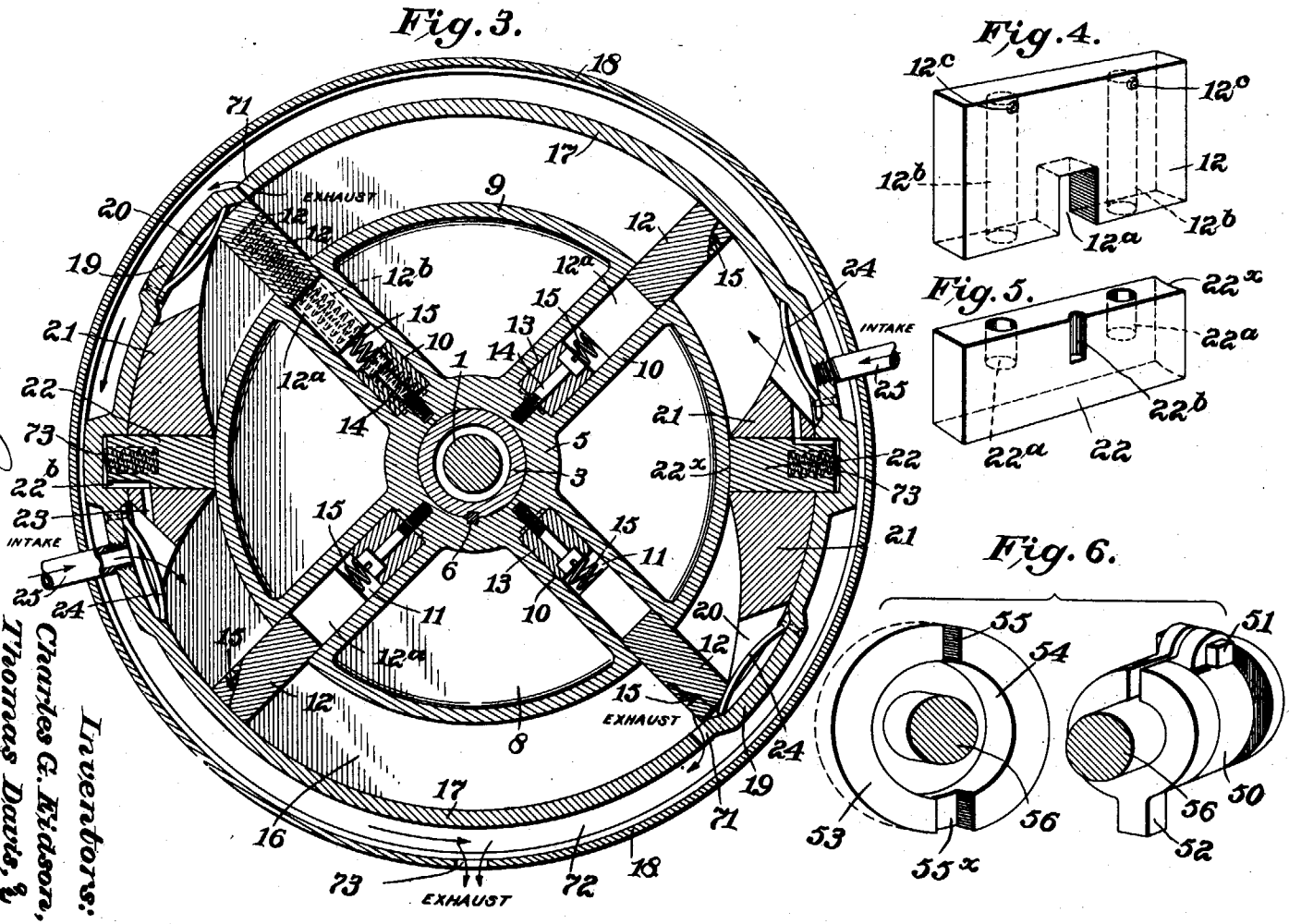
*Inventors:*
*Charles G. Eidson,*
*Thomas Davis,*
*David E. Crouse,*
by Spear, Middleton, Donaldson & Spear
Att'ys.

UNITED STATES PATENT OFFICE.

CHARLES G. EIDSON, OF ANNISTON, ALABAMA, THOMAS DAVIS, OF DETROIT, MICHIGAN, AND DAVID E. CROUSE, OF AUBURN, NEW YORK, ASSIGNORS, BY MESNE ASSIGNMENTS, TO THE JOHN FORD STARTER COMPANY, A CORPORATION OF MARYLAND.

PNEUMATIC STARTING DEVICE FOR INTERNAL-COMBUSTION ENGINES.

14,466. Specification of Reissued Letters Patent. Reissued May 7, 1918.

Original application filed January 14, 1916, Serial No. 72,069. Divided and application filed August 10, 1916, Serial No. 114,201. Original No. 1,233,855, dated July 17, 1917. Application for reissue filed January 21, 1918. Serial No. 213,080.

*To all whom it may concern:*

Be it known that we, CHARLES G. EIDSON, a citizen of the United States, residing at Camp McClellan, Anniston, county of Calhoun, and State of Alabama, THOMAS DAVIS, a citizen of the United States, residing at Detroit, in the county of Wayne and State of Michigan, and DAVID E. CROUSE, a citizen of the United States, residing at Auburn, in the county of Cayuga and State of New York, have invented new and useful Improvements in Pneumatic Starting Devices for Internal-Combustion Engines, of which the following is a specification.

Our invention relates to improvements in starting devices for internal combustion engines, and it consists in the combinations, constructions, and arrangements herein described and claimed.

An object of our invention is to provide an arrangement by means of which an internal combustion engine such as the motor of an automobile, may be started by the pushing of a pedal or other similar device, said starting being accomplished by the use of compressed air.

A further object of our invention is to provide means for furnishing a continuous supply of compressed air, said means being driven by the internal combustion engine.

A further object of our invention is to provide a novel form of clutch mechanism by means of which the air compressor may be disconnected from the engine when the pressure reaches a given amount and may be again brought into operative relation with the engine automatically when the pressure falls below a given point.

Other objects and advantages will appear in the following specification, and the novel features of the invention will be particularly pointed out in the appended claims.

Our invention is illustrated in the accompanying drawings forming a part of this specification, in which:

Fig. 3 is a section along the line 3—3 of Fig. 2, looking in the direction of the arrows.

Fig. 4 is a perspective view of one of the rotor blades or pistons.

Fig. 5 is a perspective view of one of the stator blades or abutments.

Fig. 6 is a view showing the coöperating parts of one of the clutches.

This is a divisional application based upon applicants' prior application No. 72069, filed Jan. 14, 1916.

Figure 2:
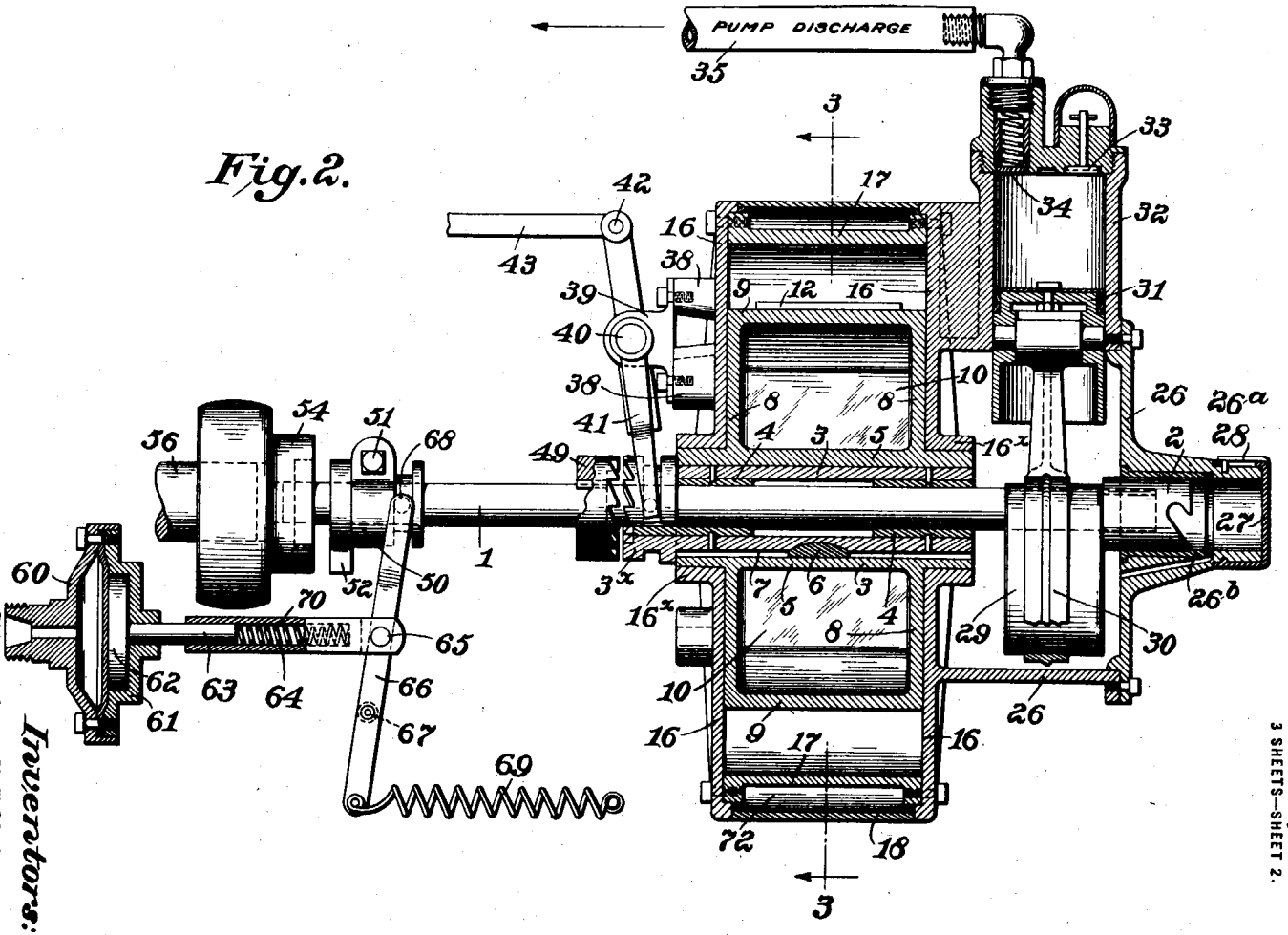
Fig. 2 is a section through the motor, compressor and a portion of the clutch operating mechanism.

Referring now particularly to Figs. 2 and 3, we have shown therein a shaft 1. One end of this shaft bears a clutch member 2 such as that ordinarily used in starting a motor or engine by hand with a crank. The shaft revolves in the interior of a sleeve 3 which is provided with anti-friction linings 4. The sleeve 3 is disposed in the interior of a hub 5 and is provided with a key 6 which slides in a groove 7 in the hub 5 so that the sleeve may have a longitudinal movement with respect to the hub, and any rotary movement of the hub will be transmitted to the sleeve. The hub 5 is provided with radially extending walls 8 which terminate in an integral cylindrical member 9. At 10, see Fig. 3, we have shown radially disposed members similar to the spokes of a wheel. These members 10 extend from one wall 8 to the other and are slotted or cored as shown at 11 to receive blades or pistons 12 which are adapted to slide radially with respect to the axis of the shaft 1. The blades or pistons are like that shown in Fig. 4. Each piston is provided with a recess $12^a$ and with bores $12^b$ extending from one edge of the piston nearly to the other edge. Laterally extending holes $12^c$ communicate with the bores as shown in Fig. 4.

At the inner end of the slots or cored out places 11 we provide lugs 13 which extend from one wall of the slot to the other, these lugs being for the purpose of strengthening the spokelike members 10 and being secured to the hub 5 by means of screws 14. It is obvious that the lugs might be formed integrally with the members 10 but we prefer to make them in the manner described because of ease in construction. The lugs 13 are arranged to enter the slots $12^a$ when the pistons are moved inwardly. Springs 15 are provided and are disposed within the bores $12^b$, these springs tending to force the pistons outwardly.

The parts 5 to 15 inclusive constitute what we term the rotor and its pistons. The stator comprises an outer casing composed of the radially extending side walls 16 and an outer cylindrical concentric portion 17 spaced from the member 9 as clearly shown in the drawings. The walls 16 have lateral extensions $16^x$ which form bearings for the sleeve 5. At opposite portions of the cylindrical member 17 are offsets 19 into which springs 20 may play. These springs 20 are disposed adjacent to approaches 21 which also serve as means for retaining the sliding abutments 22. These approaches are preferably formed as an integral casting with the wall of the cylinder 17 but may be made separately and secured to the wall. The sliding abutments are best shown in Fig. 5. From this figure it will be observed that each of the abutments is provided with bores $22^a$, that the edge of the abutment is concave as shown at $22^x$ to hug the cylinder 9, and that each abutment is provided with a groove $22^b$ which is arranged to register with a passage 23 leading to the space between the cylinders 9 and 17.

On the opposite side of the abutment, see Fig. 3, the member 21 is sloped toward the cylinder 17. A spring 24 is disposed in the offset into which the intake pipe 25 is secured. On the opposite side of the shaft a similar arrangement is provided.

Referring now particularly to Fig. 2, it will be seen that the shaft 1 passes through the casing 26 of the air compressor. This casing is provided with an extension $26^a$ which forms a bearing for the clutch 2, a lining $26^b$ being provided. At the end of the extension $26^a$ is a hinged cap 27 which is provided with a spring clasp 28 that normally holds the cap closed over the end of the extension.

Figure 1:
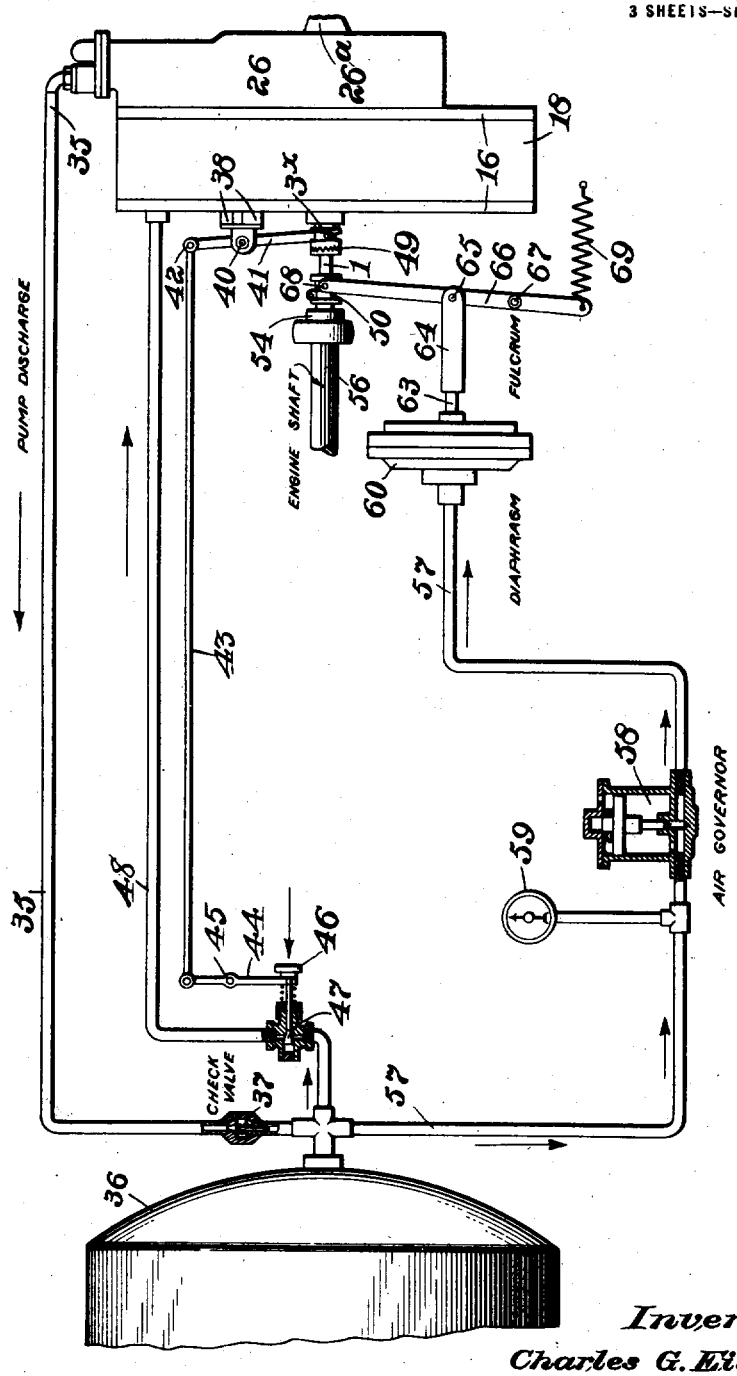
Figure 1 is a diagrammatic view showing the arrangement of the various parts of the device.

Secured to the shaft 1 is an eccentric member 29 which, as will be noted, is provided with a strap 30. The eccentric 29 is wider than the strap in order that it may have a longitudinal movement with the shaft as explained later. The strap of the eccentric is connected to a piston 31 disposed in the cylinder 32. The latter constitutes the cylinder of the compressor and is provided with check valves 33 and 34. The cylinder communicates by means of the pipe 35, with a pressure tank 36, the check valve 37 being carried by the pipe 35, as shown in Fig. 1.

Disposed on one of the walls 16 are lugs 38 to which is secured a bracket 39 for the pivot pin 40 of a lever 41. The latter is pivotally connected at 42, see Fig. 1, with a rod 43 which is connected with a lever 44 fulcrumed at 45 and extending under the spring pressed head of a push button or pedal 46 which controls an air valve 47 in a pipe 48 leading from the tank 36 and communicating with both of the intake pipes 25.

Referring now to Fig. 2, it will be seen that the sleeve 3 is provided at one end with a grooved clutch member $3^x$. The sleeve, clutch member, and the bearing linings 4 are slidable longitudinally with respect to the shaft 1 and the clutch member $3^x$ may be brought into operative engagement with the clutch member 49 which is rigidly secured to the shaft 1. At 50, see Figs. 2 and 6, we have shown a grooved clutch member which is adjustably secured to the shaft 1 preferably by means of a clamping device 51, but which is rigidly retained in position when the adjustment has been made. This clutch member 50 is provided with a tooth or lug 52 arranged to engage the semi-circular portion 53 of the companion clutch member 54, see Figs. 6 and 2, when the clutch member 50 is forced toward the clutch member 54. It will be observed, however, that if the shaft 1 is rotated and at the same time is forced toward the clutch member 54, the tooth or lug 52 will engage the shoulder 55 of the member 54, and this clutch member 54 being secured to the shaft 56 of the engine, the latter will be turned over. When, however, the engine picks up, it will of course revolve faster than the shaft 1, whereupon the shoulder 55 will leave the tooth 52 and the slot or groove $55^x$ will gradually overtake the tooth 52 whereupon the tooth will enter the slot $55^x$, thus positively connecting the engine shaft 56 with the shaft 1.

Referring now again to Fig. 1, it will be seen that the pipe 57 leads from the tank 36 to an air governor 58, a gage 59 being provided for the pipe. The pipe 57 communicates with the interior of a diaphragm casing 60 provided with a diaphragm 61. This diaphragm is arranged to bear on a plunger head 62 carried by the stem 63 which is arranged to enter a sleeve 64 pivotally connected at 65 with the lever 66 which is fulcrumed at 67. One end of this lever has an arm or yoke 68 which engages the grooved clutch member 50. The opposite end of the lever is kept under tension by a spring 69. A spiral spring 70 is disposed in the sleeve 64.

From the foregoing description of the various parts of the device, the operation thereof may be readily understood. Let us assume that the parts are connected up as shown in Fig. 1, that the engine is the motor of an automobile, and that there is air pressure in the tank 36. In starting the engine, all that is necessary is to depress the member 46, this being either a foot pedal or a hand operated device. Air is now admitted from the tank 36 and passes past the valve 47 through the pipe 48 to the intake pipes 25.

Consider now Fig. 3: The air is shown entering from the pipes 25 into the space between the cylinders 9 and 17, the pistons 12 being extended to engage the walls of the cylinders 17. The rotor will therefore be turned since the compressed air is acting on opposite sides of the pistons, which are situated on opposite sides of the shaft 1. It will also be observed that the other bore of piston 12 is in a position to provide for the exhaust of the air through the exhaust ports 71. The exhaust does not take place directly into the atmosphere but the space 72 between the outer cylindrical portion 18 and the cylindrical member 17 serves the purpose of a muffler. The exhaust finally takes place at the opening 73. This opening 73 is disposed in such position that the spent air must travel a considerable distance before finally escaping. This tends to reduce the noise of the engine and to eliminate the whistling or hissing sound.

In Fig. 3 those pistons 12 which have just passed over exhaust ports 71 will engage the springs 20. This tends to lessen the shock occasioned by striking the approaches 21. The latter are in the form of cams which cause the slidable pistons to retract against the tension of the springs 15 and thus permit the pistons to pass the abutments 22. After passing these abutments the pistons 12 are thrust forward by the springs 15 until they again contact with the inner walls of the cylindrical member 17. The springs 24 are for the purpose of cushioning the engagement of the pistons 12 with the walls 17. It will be noted that the full pressure of the steam comes on the end of the piston 12 immediately after passing the abutment. This would tend to press the piston inwardly away from the wall of the casing were it not for the fact that the steam passes through the openings $12^c$, see Fig. 4, and gets behind the piston, thereby equalizing the pressure and permitting the springs 15 to exert their maximum tension to hold the pistons in close engagement with the wall of the casing.

It will be noted that when air enters the space between the members 9 and 17, it passes at once to the inner end of the piston through the openings $12^c$ and the bores $12^b$. Thus the air pressure is equalized so that the holding of the pistons against the walls of the outer cylindrical member is assured. Similarly the air enters through the passages 23 and $22^b$, gets behind the sliding abutments 22 so as to aid the springs 73 to hold the abutments in close engagement with the outer surface of the inner cylinder 9. Simultaneously with the starting of the motor, the pressure of the pedal 46 causes the movement of the lever 41 through the medium of the rod 43 and lever 44, and this brings the clutch members $3^x$ and 49 into operative engagement, thereby imparting a rotary movement to the shaft 1.

Continued movement, however, of the lever 41 moves the shaft 1 together with the clutch member 50 toward the left of Fig. 2, thereby bringing the clutch members 52 and 55 in operative relation as before explained, and causing the engine to start up. As soon as the engine starts up, the tooth 52 will be shifted to the groove $55^x$ as before explained, so that the engine shaft 56 is now rigidly connected with the shaft 1. This will cause the starting up of the compressor through the medium of the eccentric and will supply air to the tank 36. When the pressure in the tank 36 increases to a certain amount then the air governor 58 will operate to permit the passage of air from the tank through the pipe 57 to the diaphragm casing 60. This will cause a movement of the diaphragm and the plunger 63 so as to compress the spring 70. When this pressure is sufficient it will throw out the clutch member 50, thereby disconnecting the engine 56 from the shaft 1. This will cause the stopping of the compressor.

The air in the tank may be used for other purposes, as for instance, for inflating tires. When the pressure is lowered, the spring 69 will cause the reëngagement of the clutch members 50 and 54 and hence the starting up of the pump or compressor through such engagement. It will be obvious that the motor will only remain in operation as long as the spring compressed pedal 46 is held down, so that in starting the device this pedal is held until the motor picks up, after which the air tank is automatically filled as described. There is, therefore, nothing for the operator of the car to do but push the pedal when he wishes to start his engine.

We will now show how the starter may be operated and thrown out of operation when a high pressure exists in the air tank without waiting for a building up of pressure by the pump. Assume that the tank pressure is at its maximum and the governor has disconnected clutches 50 and 54 and is being held in this position by means of diaphragm stem 63 (see Fig. 2), through lever 66. Then to start the air motor and to connect same to engine through clutches 50 and 54 a foot pedal 46 is depressed, thus moving the arm 41 through the medium of the lever 44 and link 43. The movement of the lever 41 moves shaft 1, thus shifting the arm 66, and compressing the spring 70 without, however, interfering with the position of plunger 63. When the engine starts, spring 70 disengages clutches through lever 66, and the diaphragm is not exhausted until the tank pressure is reduced below the predetermined minimum which may take several starts. Therefore, the starter may be used one or more times without waiting for the pump to restore the pressure.

We claim:

1. In a starting device for internal combustion engines, the combination of a shaft, a sleeve slidable with respect to the shaft, a clutch member carried by the shaft, a clutch member carried by the sleeve and arranged to engage the first named clutch member for connecting the sleeve with the shaft, a rotor mounted on said sleeve and having a feathered connection with the sleeve whereby the rotor is connected with the sleeve for rotative movement while the sleeve is free to move longitudinally of the rotor, and a stator disposed concentrically with respect to said rotor.

2. In a starting device for internal combustion engines, the combination of a shaft, a sleeve movable longitudinally on the shaft, a clutch member on said sleeve, a clutch member on said shaft arranged to be engaged by the first named clutch member, a rotor having feathered connection with said sleeve whereby the sleeve may move longitudinally with respect to the rotor but is rigidly connected with the rotor for rotative movement, a stator disposed concentrically of the rotor, an air cylinder, a piston in said air cylinder, an eccentric strap, a rod connecting said strap with said piston, an eccentric carried by said shaft and arranged to receive said eccentric strap, said eccentric and said strap being in operative engagement in any position of the shaft.

3. In a starting device for internal combustion engines, the combination of a shaft, a sleeve movable longitudinally on the shaft, a clutch member on said sleeve, a clutch member on said shaft arranged to be engaged by the first named clutch member, a rotor having feathered connection with said sleeve whereby the sleeve may move longitudinally with respect to the rotor but is rigidly connected with the rotor for rotative movement, a stator disposed concentrically of the rotor, an air cylinder, a piston in said air cylinder, an eccentric strap, a rod connecting said strap with said piston, an eccentric carried by said shaft and arranged to receive said eccentric strap, said eccentric being wider than said strap so as to operatively engage the strap in any position of the shaft.

4. In a starting device for internal combustion engines, the combination of a motor, an air pump driven by the motor, an air reservoir, a longitudinally movable shaft common to said motor and to said air pump, a clutch carried by the shaft for connecting the latter with the drive shaft of the engine, an automatic pneumatic clutch operating device connected with said reservoir and having means for shifting the clutch on said shaft, and manually operated means for shifting the shaft independently of said automatic operating means, said motor and said air pump being operatively connected with said shaft in any position of the latter.

5. In a starting device for internal combustion engines, the combination of a motor, an air pump driven by the motor, an air reservoir, a longitudinally movable shaft common to said motor and to said air pump, a clutch carried by the shaft for connecting the latter with the drive shaft of the engine, an automatic pneumatic clutch operating device connected with said reservoir and having means for shifting the clutch on said shaft, manually operated means for shifting the shaft independently of said automatic operating means, said motor and said air pump being operatively connected with said shaft in any position of the latter, and a second clutch carried by said shaft and adapted to be brought into engagement by the operation of said manual means for connecting the motor with the shaft.

6. In combination an air reservoir, an engine shaft, a rotor operated by compressed air, a rotor shaft slidable axially in relation to the rotor, clutch means between the rotor and the slidable shaft, means for setting said clutch to turn the shaft and also move the shaft longitudinally, a clutch between the rotor shaft and the engine shaft which is set and released by the axial movement of the rotor shaft and means for automatically releasing the last mentioned clutch and an air pump operated by the rotor shaft.

7. In combination an engine shaft, an air reservoir, a compressed air starting motor, a shaft therefor movable axially in relation to said motor, a clutch member fixed on the said axially movable shaft, a clutch member on the engine shaft to be engaged therewith and disengaged therefrom by the axial movement of the shaft, a second clutch member fixed on the motor shaft, a companion clutch member in splined connection with the motor to be rotated thereby and means for moving said companion clutch member axially to engage the said second clutch member fixed on the shaft and to move said shaft axially to be clutched to the engine shaft and a pump operated from the starting motor shaft, substantially as described.

8. In combination an engine shaft, an air reservoir, a compressed air starting motor, a shaft therefor movable axially in relation to said motor, a clutch member fixed on the said axially movable shaft, a clutch member on the engine shaft to be engaged therewith and disengaged therefrom by the axial movement of the shaft, a second clutch member fixed on the motor shaft, a companion clutch member in splined connection with the motor to be rotated thereby, and means for moving said companion clutch member axially to engage the said second clutch member fixed on the shaft and to move said shaft axially to be clutched to the engine shaft, and an air pump operated from a portion of the motor shaft extended on the side of the motor opposite that on which the said clutches are arranged, substantially as described.

9. In combination an air reservoir, a compressed air motor comprising a rotor and stator, a rotor shaft, an engine shaft, a clutch between the rotor shaft and engine shaft, means for operating the rotor shaft longitudinally to connect with the engine shaft, an air pump operated by the rotor shaft, means under control of the operator for shifting the rotor shaft in one direction to set the clutch for driving the engine shaft and pneumatically operated means having connection with the air reservoir for operating the shaft in the opposite direction, substantially as described.

10. In combination an air reservoir, a compressed air motor comprising a rotor and stator, a rotor shaft, an engine shaft, a clutch between the rotor shaft and engine shaft, means for operating the rotor shaft longitudinally to connect with the engine shaft, an air pump operated by the rotor shaft, means under control of the operator for shifting the rotor shaft in one direction to set the clutch for driving the engine shaft, and pneumatically operated means having connection with the air reservoir for operating the shaft in the opposite direction, said pneumatically operated means including a spring which is compressed when a certain pressure is present in the tank and the clutch is set, and which spring will move the shaft in said opposite direction when said pressure is maintained and the operator releases the said shaft shifting means, substantially as described.

11. In combination a compressed air reservoir, a starting motor, a shaft therefor, an engine shaft, a clutch between said starting shaft and the engine shaft, a clutch between the motor and its shaft, means for operating said clutch under the control of the operator, pneumatically operated means for throwing the first mentioned clutch out of operation when a predetermined pressure is reached in the tank and a pump for restoring pressure in the tank, substantially as described.

12. In combination a compressed air reservoir, a pump for supplying said reservoir, an engine shaft, a starting motor operated by compressed air, a shaft common to the starting motor and the pump, and movable axially, a clutch between the said shaft and the engine shaft and which is controlled by the longitudinal movement of the shaft, a clutch between said shaft and the motor with means for operating said clutch, including a manually operated member, which also operates the shaft longitudinally and sets the first mentioned clutch in position to drive the engine, air operated means for releasing the said first mentioned clutch when the pressure in the reservoir has been restored by the pump, and means for automatically resetting said clutch to drive the pump when the pressure in the reservoir is reduced, substantially as described.

13. In combination a compressed air reservoir, a pump for supplying said reservoir, an engine shaft, a starting motor operated by compressed air, a shaft common to the starting motor and the pump, and movable axially, a clutch between the said shaft and the engine shaft and which is controlled by the longitudinal movement of the shaft, a clutch between said shaft and the motor with means for operating said clutch, including a manually operated member, which also operates the shaft longitudinally and sets the first mentioned clutch in position to drive the engine, air operated means for releasing the said first mentioned clutch when the pressure in the reservoir has been restored by the pump, and means for automatically resetting said clutch to drive the pump when the pressure in the reservoir is reduced, said air operated means including a spring which is compressed when pressure is maintained in the reservoir and the first mentioned clutch is set, the said resetting means including a spring which becomes effective when the reservoir pressure is reduced below a prescribed minimum.

14. In combination a compressed air tank, a starting rotor, a shaft therefor slidable axially through the rotor, a pump operated by the said shaft, an engine shaft coaxially arranged in respect to the slidable shaft, clutch means for connecting the slidable shaft and the engine shaft and which is set by the sliding of said shaft in one direction, a spring for pressing said shaft in said direction, pneumatically operated means operated from the air in the tank opposing the action of said spring when the pressure in the tank is at a predetermined degree, a clutch between the rotor and the said shaft and means for operating the last mentioned clutch, said means being under the control of the operator, substantially as described.

In testimony whereof we affix our signatures.

CHARLES G. EIDSON.
THOMAS DAVIS.
DAVID E. CROUSE.

Copies of this patent may be obtained for five cents each, by addressing the "Commissioner of Patents, Washington, D. C."